(12) United States Patent
Cheng

(10) Patent No.: US 12,307,751 B2
(45) Date of Patent: May 20, 2025

(54) TRAINING METHOD OF NEURAL NETWORK MODEL AND ASSOCIATED DEVICE

(71) Applicant: Realtek Semiconductor Corp., HsinChu (TW)

(72) Inventor: Chia-Chun Cheng, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 406 days.

(21) Appl. No.: 17/853,914

(22) Filed: Jun. 30, 2022

(65) Prior Publication Data

US 2023/0005246 A1 Jan. 5, 2023

Related U.S. Application Data

(60) Provisional application No. 63/217,769, filed on Jul. 2, 2021.

(51) Int. Cl.
*G06V 10/776* (2022.01)
*G06T 7/70* (2017.01)
*G06V 10/82* (2022.01)
*G06V 40/10* (2022.01)

(52) U.S. Cl.
CPC .............. *G06V 10/776* (2022.01); *G06T 7/70* (2017.01); *G06V 10/82* (2022.01); *G06V 40/10* (2022.01); *G06T 2207/20081* (2013.01); *G06T 2207/20084* (2013.01); *G06T 2207/30196* (2013.01)

(58) Field of Classification Search
CPC ...... G06V 10/776; G06V 10/82; G06V 40/10; G06T 7/70; G06T 2207/20081; G06T 2207/20084; G06T 2207/30196; G06N 3/0464; G06N 3/08; G06N 3/04

See application file for complete search history.

(56) References Cited

U.S. PATENT DOCUMENTS

| 2020/0380299 | A1* | 12/2020 | Hu ......................... G06V 40/10 |
| 2022/0165048 | A1* | 5/2022 | Ham ......................... G06T 7/97 |
| 2022/0398797 | A1* | 12/2022 | Phan .................... G06N 3/0455 |

FOREIGN PATENT DOCUMENTS

| CN | 109969891 A | | 7/2019 | |
| CN | 110188641 A | * | 8/2019 | ....... G06F 18/23213 |
| CN | 112926531 A | * | 6/2021 | ......... G06K 9/00268 |
| CN | 113807152 A | * | 12/2021 | |

* cited by examiner

*Primary Examiner* — Ping Y Hsieh
*Assistant Examiner* — Vaisali R Koppolu
(74) *Attorney, Agent, or Firm* — Winston Hsu

(57) ABSTRACT

The present invention provides a training method of a neural network model, wherein the training method includes the steps of: receiving image data including a plurality of frames, and for first frames in the frames, the image data further includes detection data, and the detection data includes position of at least one person within the corresponding first frame; and for second frames in the frames, the image data further includes person search data, and the person search data includes position and serial number of at least one person within the corresponding second frame; using the neural network model to perform a person recognition operation on the frames to generate a recognition result; and using loss functions to process the recognition result of each frame, the detection result of each first frame and the person search data of each second frame, for adjusting parameters of the neural network model.

8 Claims, 3 Drawing Sheets

TRAINING METHOD OF NEURAL NETWORK MODEL AND ASSOCIATED DEVICE

CROSS REFERENCE TO RELATED APPLICATIONS

This application claims the benefit of U.S. Provisional Application No. 63/217,769, filed on Jul. 2, 2021. The content of the application is incorporated herein by reference.

BACKGROUND OF THE INVENTION

1. Field of the Invention

The present invention relates to a training method of a neural network model.

2. Description of the Prior Art

Video understanding is currently widely used in many levels of society, for example, it can be used in remote video conferences, and person recognition or face recognition is an important technical content in the application of video understanding. In the operation of person recognition, deep learning or neural network methods are usually used to process each frame in the image data to identify whether there is a person in the image data, and even identify each person's identity. However, before performing the person identification through deep learning or neural network, the related neural network model needs to be trained to optimize the parameters in the model, and how to efficiently train the neural network model to get the most suitable parameters is an important topic.

SUMMARY OF THE INVENTION

It is therefore an objective of the present invention to provide a training method of a neural network model, which can form a set of image data from an image containing only the position information of each person and an image containing the position information and a serial number of each person for training the neural network model efficiently to obtain the most suitable parameters, to solve the above-mentioned problems.

According to one embodiment of the present invention, a training method of a neural network model comprises the steps of: receiving image data, wherein the image data comprises a plurality of frames, and for a plurality of first frames in the plurality of frames, the image data further comprises detection data of each first frame, and the detection data comprises position of at least one person within the corresponding first frame; and for a plurality of second frames in the plurality of frames, the image data further comprises person search data of each second frame, and the person search data comprises position and serial number of at least one person within the corresponding second frame; using the neural network model to perform a person recognition operation on the plurality of frames to generate a recognition result; and using a plurality of loss functions to process the recognition result of each frame, the detection result of each first frame and the person search data of each second frame, for adjusting parameters of the neural network model.

According to one embodiment of the present invention, a device comprising a person search module and a calculation and control module is disclosed. The person search module is configured to receive image data, and use a neural network model to perform a person recognition operation on the plurality of frames to generate a recognition result, wherein the image data comprises a plurality of frames, and for a plurality of first frames in the plurality of frames, the image data further comprises detection data of each first frame, and the detection data comprises position of at least one person within the corresponding first frame; and for a plurality of second frames in the plurality of frames, the image data further comprises person search data of each second frame, and the person search data comprises position and serial number of at least one person within the corresponding second frame. The calculation and control module is configured to use a plurality of loss functions to process the recognition result of each frame, the detection result of each first frame and the person search data of each second frame, for adjusting parameters of the neural network model.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
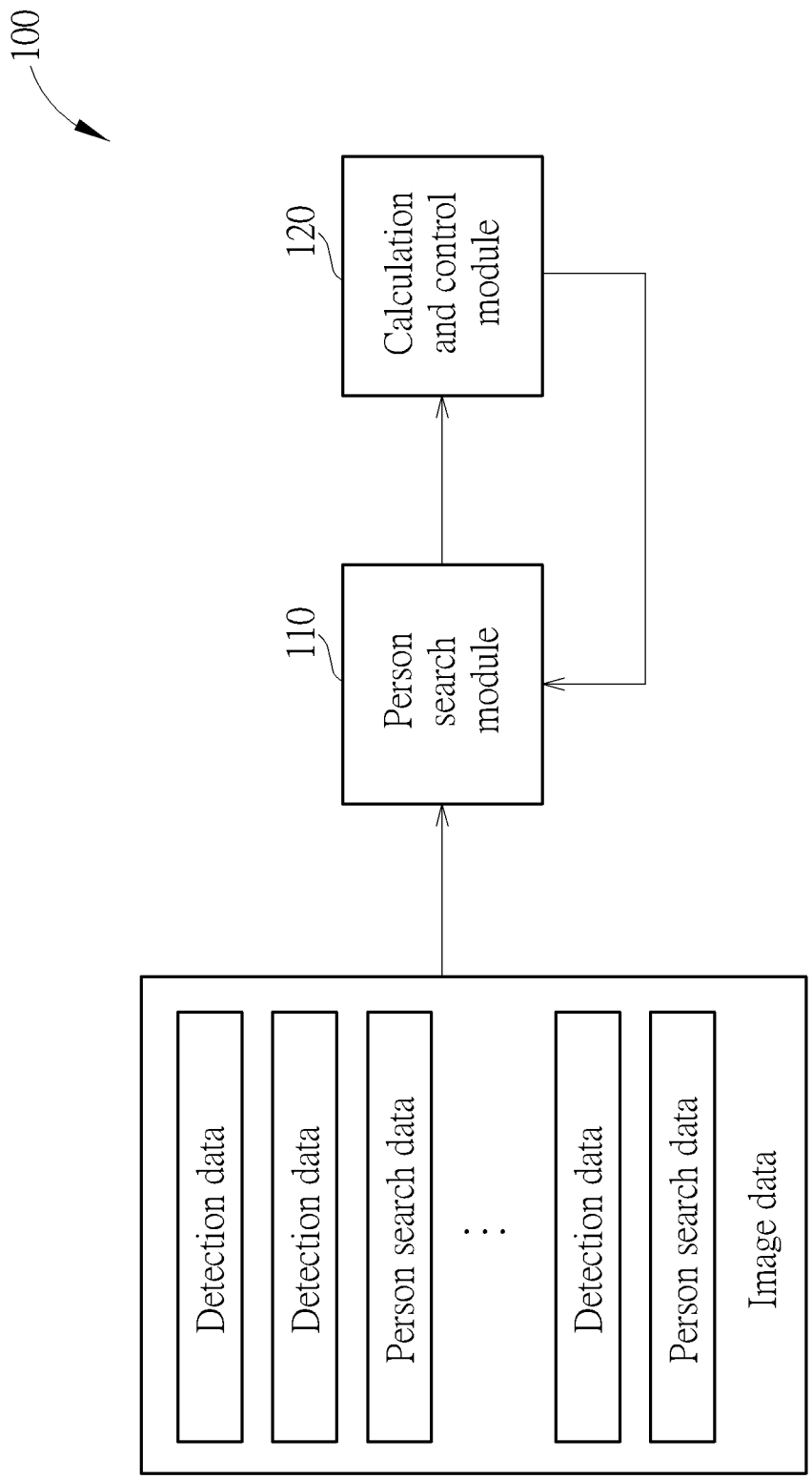
FIG. 1 is a diagram of a device for training a neural network model according to one embodiment of the present invention.

FIG. 1 is a diagram of a device 100 for training a neural network model according to one embodiment of the present invention, wherein the device 100 comprises a person search module 110 and a calculation and control module 120, and the person search module 110 and the calculation and control module 120 can be implemented by hardware circuits. In this embodiment, the device 100 is used to train the neural network model in the person search module 110 to obtain optimal parameters. Specifically, the engineer will provide a lot of image data including person images to the person search module 110, wherein the image data also include the position and/or serial number of the person in each frame of the image data. Then, the person search module 110 including a neural network model processes each frame in the image data, for example, the person search module 110 uses multiple different convolution filters to perform multiple convolution operations on the frame, so as to identify the position and characteristic value of the person in the frame. Then, the calculation and control module 120 compares position and characteristic value of the person in the frame generated by the person search module 110 with the position and/or the serial number of the person inputted by the engineer, to generate multiple loss functions for adjusting the parameters of multiple convolution filters of the neural network model included in the person search module 110, to optimize the neural network model. It should be noted that since the main operations of the person search module 110 are well known to those skilled in the art, and the present invention focuses on the contents of the image data processed by the person search module 110 and the corresponding loss function, the following content does not describe the detailed operation of person search module 110.

Figure 2:
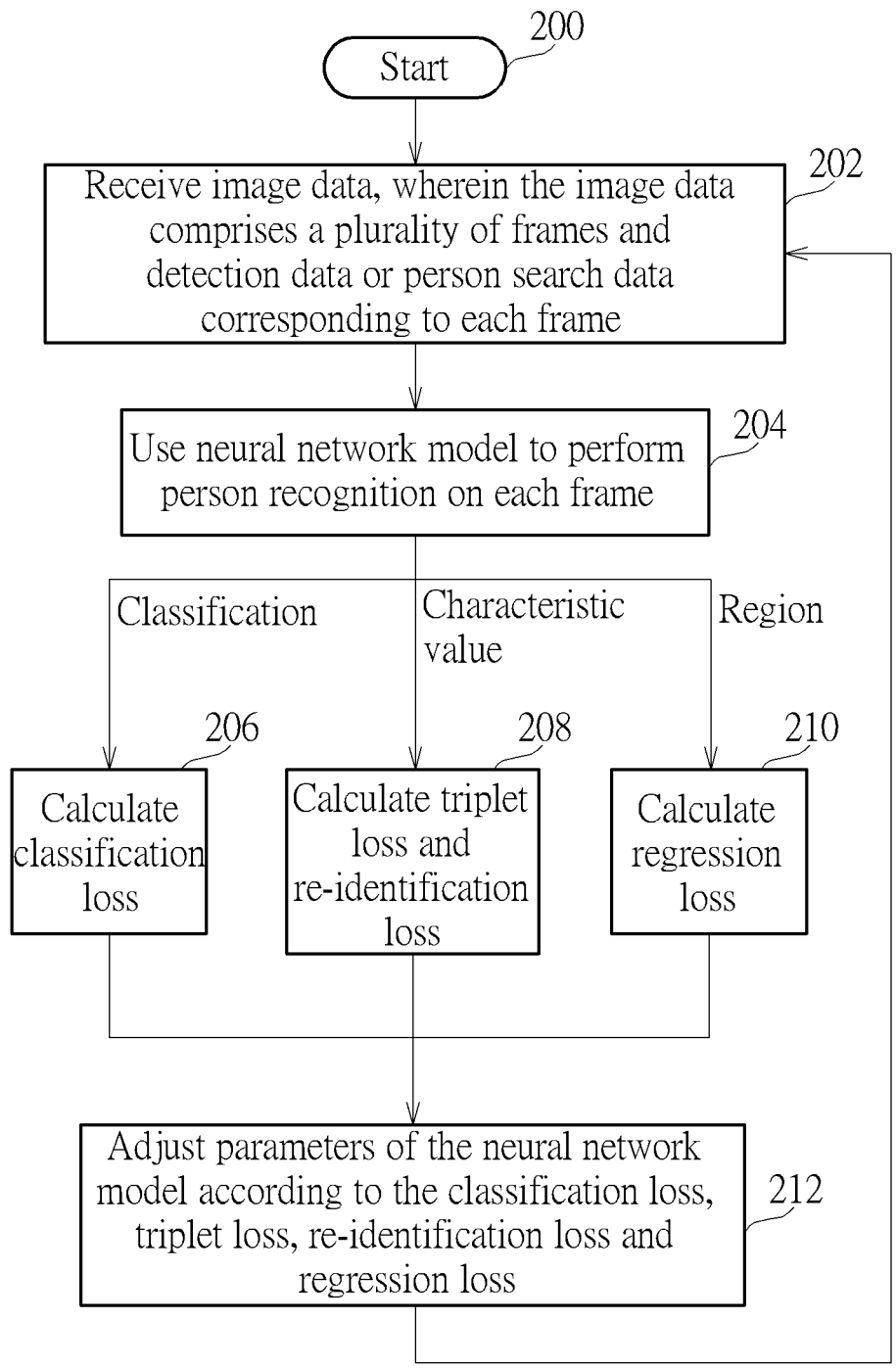
FIG. 2 is a flowchart of a training method of the neural network model according to one embodiment of the present invention.
Figure 3:
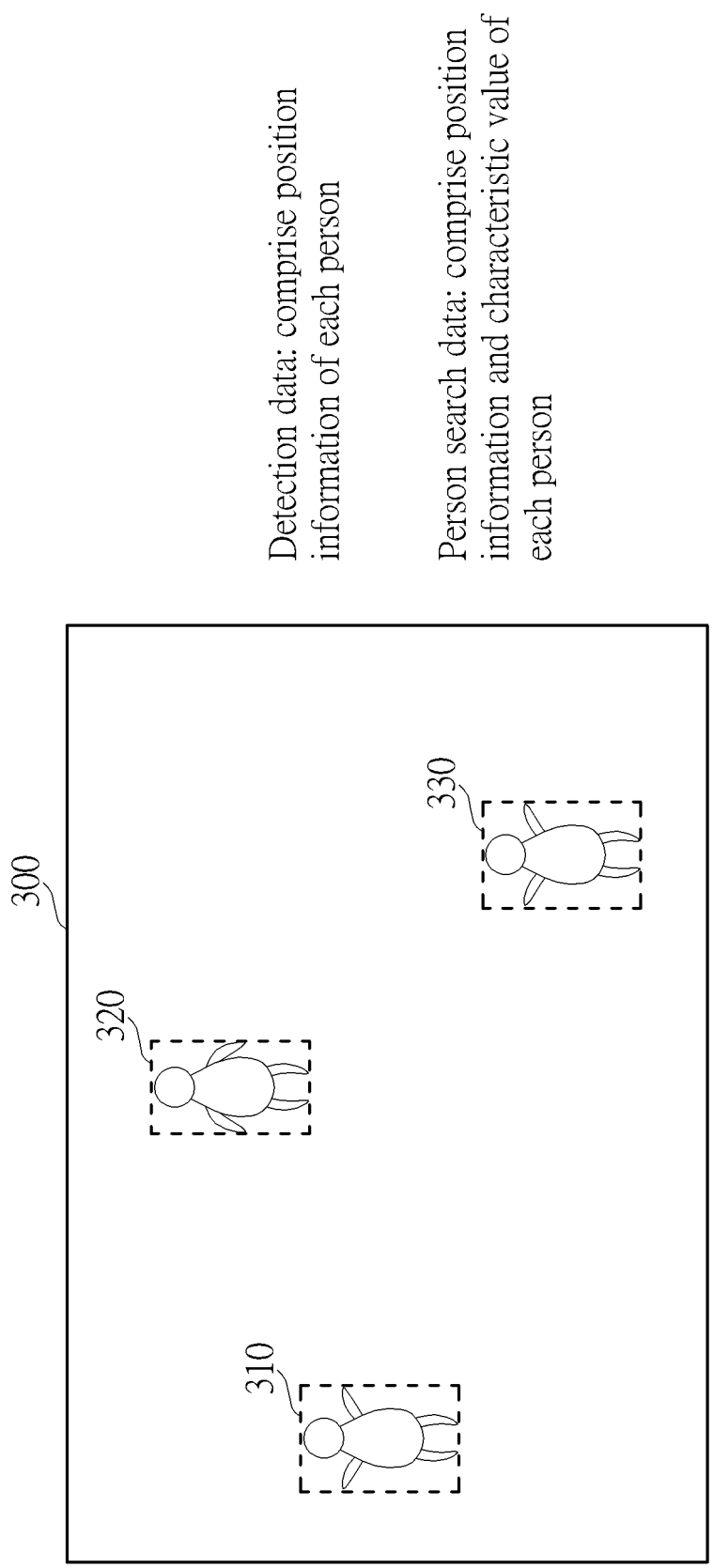
FIG. 3 is a diagram illustrating detection data or person search data included in image data according to one embodiment of the present invention.

In the operation of the device 100, referring to the flowchart shown in FIG. 2 together, in Step 200, the process starts, and the device 100 is powered on and the initialization operation is completed. In Step 202, the person search module 110 receives image data, wherein the image data includes a plurality of frames, such as 32 frames, and the image data further includes the detection data or person search data corresponding to each frame. In detail, referring to a frame 300 shown in FIG. 3, assuming that the frame 300 includes three persons, the detection data corresponding to the frame 300 is the position information of the persons, such as the positions of the regions 310, 320 and 330 shown in FIG. 3; and the person search data corresponding to the frame 300 not only includes the position information of the person (for example, the regions 310, 320, and 330), but also includes the serial number of each person, wherein the serial number of the person is marked based on all person search data to distinguish whether it is the same person, wherein the same serial number means the same person, and different serial numbers correspond to different persons. For example, the persons in the regions 310, 320, and 330 are all different persons, so the serial number in the region 310 may be '0', the serial number in the region 320 may be '1', and the serial number in the region 330 may be '2'. In other words, the above-mentioned detection data can be regarded as a part of the person search data, that is, the detection data does not include the serial numbers of the persons in the regions 310, 320, and 330. In addition, in this embodiment, each frame only corresponds to one of the detection data and the person search data. For example, in the image data, the first frame corresponds to the detection data, the second frame corresponds to the detection data, the third frame corresponds to the person search data, . . . etc.

It should be noted that the detection data and person search data in the above-mentioned image data can be regarded as the correct content of the frame after being processed by the neural network model, that is, the detection data and the person search data include correct position information and correct serial number of the person in the frame.

In Step 204, the person search module 110 sequentially performs person recognition on each frame in the image data to generate a recognition result. In this embodiment, the recognition result includes the image classification, the position information of the person and the characteristic value of the person, wherein the position information of the person is similar to the regions 310, 320, and 330 in FIG. 3, and the characteristic value of the person is similar to the characteristic value of the image contents in the regions 310, 320 and 330. It should be noted that since the neural network model in the person search module 110 does not have optimal parameters, the recognition result of each frame is not exactly the same as the detection data/person search data.

In Step 206, the calculation and control module 120 uses a classification loss function to process the image classification in the recognition result to calculate a classification loss. In this embodiment, since this embodiment involves person recognition, the image classification is person, and the classification loss is used to indicate the accuracy with which the person search module 110 identifies that the frame comprises at least one person.

In Step 208, the device 100 has a characteristic value database that is recorded according to the serial number of each person, and the database is updated along with the training process. For the characteristic value of the person of the recognition result, the serial number of the person of the person search data and the characteristic value database, the calculation and control module 120 uses a loss function, such as contrastive loss function and triplet loss function, to calculate the difference of the characteristic values in the recognition result, to obtain a re-identification loss. Meanwhile, the characteristic values of the person are added into the characteristic value database with the serial number of the person. In this embodiment, since only some of the frames have person search data, the calculation and control module 120 only calculates the re-identification loss for the frames with person search data.

In addition, for the frame with detection data, since the multiple persons in the same frame are not the same person, ideally, the characteristic values of the multiple persons in the same frame will have larger difference. Therefore, the calculation and control module 120 uses a triplet loss function to process multiple characteristic values in the same frame to obtain a triplet loss, wherein the triplet loss can reflect the difference between the characteristic values of the multiple persons in the same frame. It should be noted that, since the details of the triplet loss function are well known to those with ordinary knowledge in the art, the key point of Step 208 is to use the triplet loss function to process the characteristic value of multiple persons in the same frame, so the details of the triplet loss function are omitted here.

In the operations of Step 204 and Step 208, for the frame with detection data, the calculation and control module 120 only calculates the triplet loss; and for the frame with person search data, the calculation and control module 120 only calculates the re-identification loss. In other embodiments, however, for the frame with person search data, the calculation and control module 120 can calculate the re-identification loss and the triplet loss, and this alternative design should belong to the scope of the present invention.

In Step 210, the calculation and control module 120 uses a regression loss function to process the position of the person in the recognition result to calculate a regression loss. For example, the calculation and control module 120 may use the mean square error (MSE) and the mean absolute value error to calculate the difference between the position of the person in the recognition result with the position of the person in the detection data/person search data, to obtain the regression loss.

In Step 212, the calculation and control module 120 adjusts the parameters of the neural network model in the person search module 110 according to the classification loss, triplet loss, re-identification loss and regression loss to optimize the neural network models. For example, the calculation and control module 120 can adjust the parameters in the person search module 110 so that the class loss, re-identification loss and regression loss have lower values, and the triplet loss can reflect the large difference between the characteristic values of multiple persons in the same frame.

Then, the flow goes back to Step 202, and the person search module 110 receives next image data for similar processing.

In the above embodiment, by mixing the frames with detection data and the frames with person search data in the image data, the device 100 can have generalization ability when training a neural network model. Furthermore, since the frames with detection data have a large number of samples, the device can have a lot of image data for training, so that the neural network model is more effective in optimization. In addition, by calculating the triplet loss for the frame with detection data, and calculating the re-identification loss for the frame with person search data, to adjust the parameters of the neural network model, the neural network model can be optimized more efficiently Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A training method of a neural network model, comprising:
   receiving image data, wherein the image data comprises a plurality of frames, and for a plurality of first frames in the plurality of frames, the image data further comprises detection data of each first frame, the detection data comprises position of at least one person within the corresponding first frame, and the detection data does not comprise any serial number of the person; and for a plurality of second frames in the plurality of frames, the image data further comprises person search data of each second frame, and the person search data comprises position and serial number of at least one person within the corresponding second frame;
   using the neural network model to perform a person recognition operation on the plurality of frames to generate a recognition result; and
   using a plurality of loss functions to process the recognition result of each frame, the detection data of each first frame and the person search data of each second frame, for adjusting parameters of the neural network model.

2. The training method of claim 1, wherein each of at least a portion of the first frames comprises a plurality of persons.

3. The training method of claim 1, wherein the step of using the neural network model to perform the person recognition operation on the plurality of frames to generate the recognition result comprises:
   using the neural network model to perform the person recognition operation on the plurality of first frames to generate a plurality of first recognition results, respectively;
   using the neural network model to perform the person recognition operation on the plurality of second frames to generate a plurality of second recognition results, respectively; and
   the step of using the plurality of loss functions to process the recognition result of each frame, the detection data of each first frame and the person search data of each second frame, for adjusting the parameters of the neural network model comprises:
   using a first loss function to process the plurality of first recognition results and the position of at least one person within the corresponding first frame to generate a triplet loss of each first frame;
   using a second loss function to process the plurality of second recognition results and the serial number of at least one person within the corresponding second frame to generate a re-identification loss of each second frame; and
   adjusting the parameters of the neural network model according to the triplet loss of each first frame and the re-identification loss of each second frame.

4. The training method of claim 1, wherein the step of using the neural network model to perform the person recognition operation on the plurality of frames to generate the recognition result comprises:
   using the neural network model to perform the person recognition operation on the plurality of first frames to generate a plurality of first recognition results, respectively;
   using the neural network model to perform the person recognition operation on the plurality of second frames to generate a plurality of second recognition results, respectively; and
   the step of using the plurality of loss functions to process the recognition result of each frame, the detection data of each first frame and the person search data of each second frame, for adjusting the parameters of the neural network model comprises:
   using a first loss function to process the plurality of first recognition results and the position of at least one person within the corresponding first frame to generate a triplet loss of each first frame;
   using the first loss function and a second loss function to process the plurality of second recognition results and the position and the serial number of at least one person within the corresponding second frame to generate the triplet loss of each second frame and a re-identification loss of each second frame; and
   adjusting the parameters of the neural network model according to the triplet loss of each first frame, the triplet loss of each second frame and the re-identification loss of each second frame.

5. A device, comprising:
   a person search module circuit, configured to receive image data, and use a neural network model to perform a person recognition operation on a plurality of frames to generate a recognition result, wherein the image data comprises the plurality of frames, and for a plurality of first frames in the plurality of frames, the image data further comprises detection data of each first frame, the detection data comprises position of at least one person within the corresponding first frame, and the detection data does not comprise any serial number of the person; and for a plurality of second frames in the plurality of frames, the image data further comprises person search data of each second frame, and the person search data comprises position and serial number of at least one person within the corresponding second frame; and
   a calculation and control module circuit, configured to use a plurality of loss functions to process the recognition result of each frame, the detection data of each first frame and the person search data of each second frame, for adjusting parameters of the neural network model.

6. The device of claim 5, wherein each of at least a portion of the first frames comprises a plurality of persons.

7. The device of claim 5, wherein the person search module circuit uses the neural network model to perform the person recognition operation on the plurality of first frames to generate a plurality of first recognition results, respectively, and uses the neural network model to perform the person recognition operation on the plurality of second frames to generate a plurality of second recognition results, respectively; and the calculation and control module circuit uses a first loss function to process the plurality of first recognition results and the position of at least one person within the corresponding first frame to generate a triplet loss of each first frame, uses a second loss function to process the plurality of second recognition results and the serial number of at least one person within the corresponding second frame to generate a re-identification loss of each second frame, and adjusts the parameters of the neural network model according to the triplet loss of each first frame and the re-identification loss of each second frame.

8. The device of claim 5, wherein the person search module circuit uses the neural network model to perform the person recognition operation on the plurality of first frames to generate a plurality of first recognition results, respectively, and uses the neural network model to perform the person recognition operation on the plurality of second frames to generate a plurality of second recognition results, respectively; and the calculation and control module circuit uses a first loss function to process the plurality of first recognition results and the position of at least one person within the corresponding first frame to generate a triplet loss of each first frame, uses the first loss function and a second loss function to process the plurality of second recognition results and the position and the serial number of at least one person within the corresponding second frame to generate the triplet loss of each second frame and a re-identification loss of each second frame, and adjusts the parameters of the neural network model according to the triplet loss of each first frame, the triplet loss of each second frame and the re-identification loss of each second frame.

* * * * *